United States Patent [19]

Stadler

[11] 4,134,105
[45] Jan. 9, 1979

[54] ALPHANUMERIC DISPLAY DEVICE WITH KEYBOARD FOR USE WITH PHOTOGRAPHIC SYSTEM

[76] Inventor: Gary D. Stadler, 5459 Moonlight La., La Jolla, Calif. 92037

[21] Appl. No.: 766,890

[22] Filed: Feb. 9, 1977

[51] Int. Cl.² .............................................. G06F 3/14
[52] U.S. Cl. .................................. 354/105; 340/711; 355/39; 340/802
[58] Field of Search ................... 340/324 R, 336, 337; 354/105–109; 355/39, 40

[56] References Cited

U.S. PATENT DOCUMENTS

| | | | |
|---|---|---|---|
| 3,710,696 | 1/1973 | Tucker et al. | 354/105 |
| 3,775,007 | 11/1973 | Davidson | 354/105 |

OTHER PUBLICATIONS

*An Alphanumeric Display as a Communication Aid for the Dumb*, Newell, 1/75, Med. & Biol. Engrg.; pp. 84–88.

Primary Examiner—Marshall M. Curtis
Attorney, Agent, or Firm—Brown & Martin

[57] ABSTRACT

A display device for use with a photographic system that includes a platform for receiving objects to be photographed and a support for a camera used for photographing objects received on the platform. The display device includes a plurality of digit sections arrayed to provide a display of a multiple digit number, a keyboard device for selecting characters to be displayed and an electrical circuit. Each of the digit sections includes a display element having an array of a plurality of segments that are separately actuated in response to predetermined combinations of electrical signals for providing a display of a selected numeric character. The electrical circuit provides the predetermined combinations of electrical signals in response to the operation of the keyboard, and further includes counters for increasing the displayed number by one count in response to a predetermined input signal. The display device may be positioned on the platform when a photograph is made of an object received on the platform to enable the photograph to include both the image of the selected characters displayed by the display device and the image of said object.

A preferred application is using the display device to display an identification number relating to the object that is being photographed in a microfilming process so that the identification number is also included in the photograph. A predetermined input signal is provided so as to increase the identification number by one count as each photograph is made.

19 Claims, 4 Drawing Figures

ALPHANUMERIC DISPLAY DEVICE WITH KEYBOARD FOR USE WITH PHOTOGRAPHIC SYSTEM

BACKGROUND OF THE INVENTION

The present invention is directed to a display device for use with a photographic system.

In the process of photographing objects on microfilm, it sometimes is considered desirable for the photograph of the object to include identification data related to the object. Such photographic systems essentially include a platform for receiving objects to be photographed, a support for a camera used for photographing objects received on the platform, and a resettable counter built into the chassis containing the platform for displaying a count of the number of photographic exposures made by the camera. However, such a counter is electromechanical and can be preset to a predetermined number only by manually turning counter wheels. Also many such counters include numeric characters that are so small that they are not always clearly distinguishable upon photographic reproduction.

SUMMARY OF THE INVENTION

The present invention provides a display device for use in combination with a photographic system that includes a platform for receiving objects to be photographed and means for supporting a camera for photographing objects received on the platform. The display device includes a plurality of digit sections that are responsive to predetermined combinations of electrical signals for providing a display of an array of selected alphanumeric characters; an alphanumeric keyboard device for selecting the characters to be displayed; and an electrical circuit for providing the predetermined combinations of electrical signals in response to the operation of the keyboard device. The display device may be positioned on the platform when a photograph is made of an object received on the platform to enable the photograph to include both the image of the selected characters displayed by the display device and the image of the object.

The keyboard device can be operated so as to provide a display of whatever identification data is desired. For example, such data may include a date and/or a volume and page number in addition to, or instead of a number relating to a position in a sequence of photographed objects. Alphabet characters also can be displayed if desired.

In a preferred embodiment of the display device the digit sections are arrayed to provide a display of a multiple digit number; each of the digit sections includes a display element having an array of a plurality of segments that are separately actuated in response to the predetermined combinations of electrical signals for providing a display of a selected numeric character; and the circuit further includes counters for increasing the displayed number by a predetermined count such as one count, in response to a predetermined input signal. The predetermined input signal may be provided either by operation of the keyboard device, or by an attachment to a camera positioned for taking photographs of objects received on the platform. The attachment provides the predetermined input signal in response to the operation of the camera in taking a photograph.

Additional features of the present invention are discussed in relation to the description of the preferred embodiment.

DESCRIPTION OF THE PREFERRED EMBODIMENT

Figure 1:
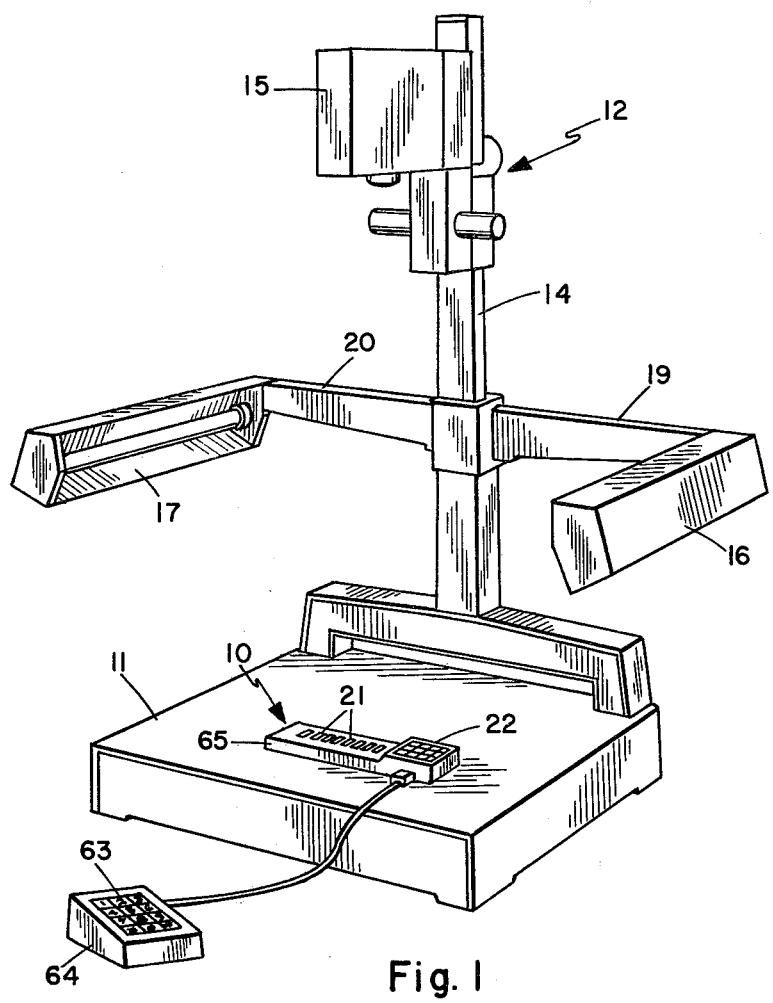
FIG. 1 is a perspective view of a combination of a photographic system and a display device in accordance with the present invention.

Referring to FIG. 1, a portable display device 10 is shown positioned on the platform 11 of a photographic system 12, such as is used in microfilm processing. In addition to the platform 11 for receiving objects to be photographed, the photographic system 12 includes a supporting column 14 for supporting a camera. A camera 15 is supported on the column 14 in a position for taking photographs of objects received on the platform 11. The photographic system 12 also includes two fluorescent lamps 16, 17 supported by arms 19, 20 for providing all points illumination over that portion of the surface of the platform 11 that is within the field of view of the camera 15.

Figure 2:
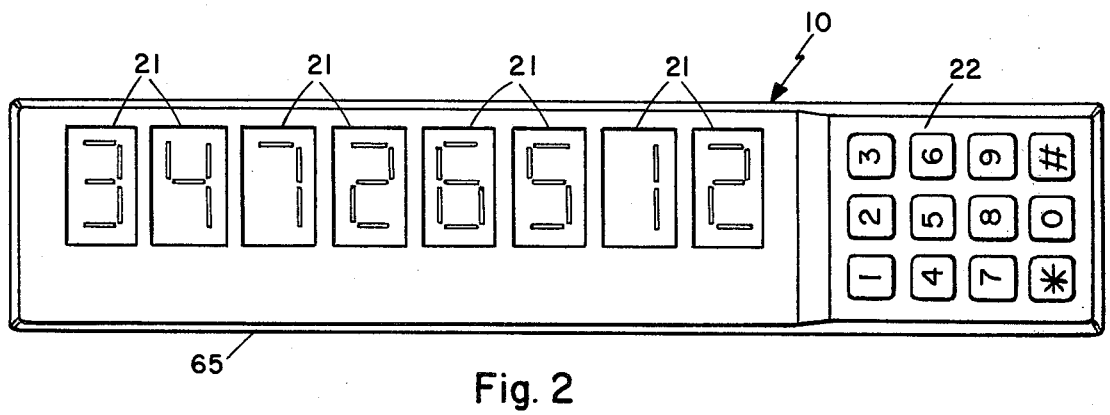
FIG. 2 is a plan view of the display device shown in FIG. 1.

The display device 10 (which is also shown in FIG. 2) includes eight digit sections 21 and a keyboard device 22. The number of digit sections 21 may be varied in accordance with the identification data desired for the particular photographic system with which the display device 10 is to be used. In the embodiment shown in FIGS. 1 and 2 the digits sections are arrayed to provide a display of a eight digit number.

Figure 3:
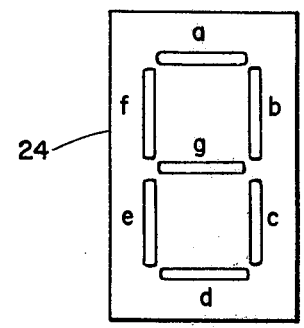
FIG. 3 is a view of an array of the segments in a digit section of a display device.

Each of the digit sections 21 includes a display element 24 having seven segments (identified by "a" through "g" in FIG. 3) that are separately actuated in order to provide a display of a selected numeric character, and a digit driver 25.

The keyboard device 22 includes ten keys identified by the numeric characters "0", "1", "2", "3", "4", "5", "6", "7", "8", and "9", and two function keys identified by the symbols "*" and "#". Numeric characters are selected for display in the digit sections 21 by operating the keys on the keyboard device 22.

Figure 4:
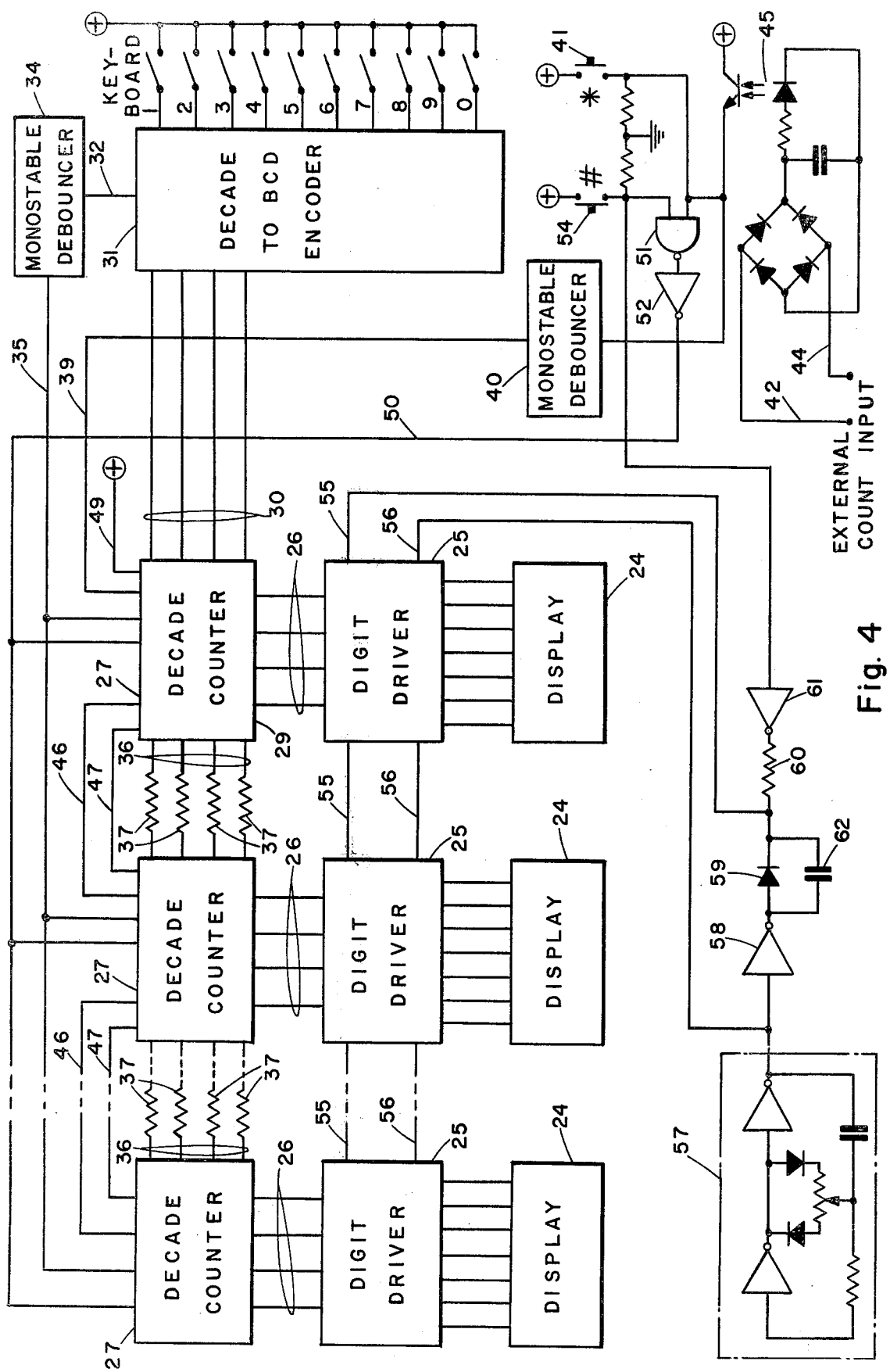
FIG. 4 is a schematic circuit diagram of the display device.

Referring to the schematic circuit diagram of FIG. 4, the segments in each of the display elements 24 are separately actuated by an integrated circuit digit driver 25 in response to predetermined combinations of electrical signals received on lines 26 from an integrated circuit binary counter 27. Combinations of display element 24, digit driver 25, and binary counter 27 are shown in FIG. 4 for only the two least significant digits and the most significant digit in the eight digit display.

The binary counter for the least significant digit 29 receives a predetermined combination of electrical signals in the form of a binary coded decimal (BCD) signal at its input terminals on lines 30 from a decade to BCD encoder circuit 31. The BCD signal on lines 30 is produced by the encoder circuit 31 in response to a keyboard device key terminal (labeled 1 through 0) being connected to positive DC potential by operation of a corresponding key in the keyboard device 22.

Each time a key is operated in the keyboard device 22 the encoder 31 provides a signal on line 32 to a monostable debouncer circuit 34 which in turn provides a load pulse on line 35 to each of the counters 27.

Each of the binary counters 27 stores the BCD signal present at its input terminals whenever a load pulse is received on line 35. The stored BCD signal is provided at the output terminals of the binary counter 27. The output terminals of the binary counter 27 are connected in parallel to both the digit driver 25 via lines 26 and the digit driver corresponding to the next greater significant digit in the multiple digit display via lines 36. Each of the binary counters 27 is a CMOS integrated circuit binary counter, which has a given input capacitance. Each of the lines 36 for transferring BCD signals from one counter 27 to the counter corresponding to the next greater digit includes a resistance 37. This resistance in combination with the given input capacitance of the CMOS integrated circuit binary counter 27 provides a delay in the transfer of the BCD signal from one counter to the counter corresponding to the next greater significant digit for a duration which is in excess of the duration of the load pulse on line 35. Accordingly the BCD signal stored in one counter 27 is stored in the counter corresponding to the next greater significant digit each time a load pulse is received on line 35. Therefore, each time a numeric character key on the keyboard device 22 is operated the corresponding character is displayed by the display element 24 for the least significant digit in the display and the characters previously displayed are transferred to the display elements 24 for the next greater significant digits in the display.

Thus a number is loaded into the display device 10 in the same manner as a number is loaded into the display of an electronic calculator, by operating the keyboard device 22 by beginning with the most significant digit in the number to be displayed. However, this function is achieved in the display device of the present invention by a combination of elements that is less complex than those by which this function typically is achieved in the prior art.

The count stored in each binary counter 27 is increased by one count each time a predetermined input signal is received at the "count-up" input terminal of the binary counter 27. The binary counter corresponding to the least significant digit 29 receives this predetermined input pulse on line 39 from a monostable debouncer circuit 40. The monostable debouncer circuit 40 provides the predetermined input pulse on line 39 in response to either (1) the operation of the keyboard device key having the symbol "*" to connect the terminal 41 to a source of positive potential, or (2) the occurance of a signal across terminals 42 and 44 in response to the operation of the camera shutter (not shown). The signal across terminals 42 and 44 is transferred to the monostable debouncer circuit 40 by means of an optical coupler device 45.

When the count in the binary counter 27 is increased to a count corresponding to a decimal "10", the counter is reset to a zero count and a "carry" pulse is provided on line 46 to the counter corresponding to the next greater significant digit.

The lines 47 between the binary counters 27 which are typically used for borrowing a count when the counters are used for a substraction function are not used. The "count-down" input for the binary counter for the least significant digit 29 is connected to a source of positive potential via line 49 so as to be disabled.

All of the binary counters 27 can be reset to a zero count in response to a reset pulse on line 50. A reset pulse is provided on line 50 by NAND gate 51 through an inverter 52 when terminal 41 and terminal 54 are simultaneously connected to sources of positive potential. Terminal 54 is connected to source of positive potential when the keyboard device key having the symbol "#" is operated. Thus the counters are reset to zero when the keys * and # are operated simultaneously.

Whenever the key having the # symbol is operated to connect terminal 54 to a source of positive potential, a train of "test" signal pulses is provided on line 55 to the "test" input of all of the digit drivers 25. When a signal pulse is provided on line 55 the digit drivers 25 actuate all of the segments in the display elements 24 such that each digit section 21 provides a display of the numeral "8". This function is provided for testing the display device 10 to assure that all display segments can be actuated.

In the preferred embodiment these segments are tungsten filaments which are illuminated when actuated by the digit drivers 25. The signal pulses provided on line 55 when the # key is operated are derived from an adjustable pulse width oscillator 57 and are provided through inverter 58 and diode 59 at a duty cycle that is sufficient to assure that the segments are all illuminated at a level that is clearly visible. The diode 59 in combination with a resistance 60 modulates the signal provided at the output of the inverter 61 when the "#" key is operated to keep the filaments from burning out.

The digit drivers 25 are enabled to actuate the separate display of those segments that are selected in response to the BCD signals on lines 29 when an "enable" signal pulse is received on line 56. Enable signal pulses are provided on line 56 from the adjustable pulse width oscillator 57. The oscillator 57 operates at a first predetermined duty cycle for providing illumination of the selected segments at a first level that is clearly visible to the film in the camera 15.

At the beginning of each pulse interval in the signal provided on line 56, pulses are also provided on line 55. The combination of inverter 58, resistance 60, and capacitor 62 causes the pulses provided on line 55 when the "#" key is not operated to be of very short duration. Thus when the "#" key is not operated, pulses are provided on line 55 at a second predetermined duty cycle for providing illumination of the non-selected display segments at a level that is not clearly visible to the camera film. By providing these short duration pulses to the non-selected segments, all of the segments are kept sufficiently warm that they are not subject to thermal shock each time they are illuminated so as to be clearly visible. This increases the lifetime of the tungsten display segments. This particular feature is not included in an alternative embodiment wherein the display segments are other than tungsten filaments.

In one alternative preferred embodiment the display segments are liquid crystals. The display segments also may be LED's although LED's do not perform as well as tungsten filaments or liquid crystals. Other electro-optical devices also may be used for the display elements without departing from the scope of the present invention.

Referring again to FIG. 1, in an alternative embodiment, a remote keyboard device 63 is included in a separate chassis 64 that is remote from the chassis 65 which includes the digit sections 21. The remote keyboard device 63 can then be operated at a location remote from the digit sections. Also the remote keyboard device 63 can be operated without the possibility of disturbing the physical position of the chassis 65 including the digit sections 21; the chassis 64 being portable in the preferred embodiment. The remote keyboard device 63 is connected to the same terminals of the encoder 31 as is the keyboard device 22 in the chassis 65. In accordance with this embodiment the keyboard device 22 may be completely eliminated from the chassis 65.

Each of the binary counters 27 is a CMOS integrated circuit; each of the digit drivers 25 is a CMOS integrated circuit; and each of the debouncer circuits 34, 40 is a CMOS integrated circuit.

It is preferred that the dimensions of the digit segments be such as to provide a character that is at least 9 milimeters high and 4.5 milimeters wide. Characters of such dimensions are sufficiently large that they can be clearly distinguished upon photographic reproduction.

Having described my invention, I now claim:

1. A display device for use with a photographic system that includes a platform for receiving objects to be photographed and means for supporting a camera for photographing objects received on said platform, said display device comprising a plurality of digit sections arrayed to provide a display of a multiple digit number, each of which digit sections includes a display element having an array of a plurality of segments that are separately actuated in response to predetermined combinations of electrical signals for providing a display of a selected numeric character;

selecting means comprising a numeric keyboard device for selecting characters to be displayed; and circuit means for providing said predetermined combinations of electrical signals in response to the operation of said keyboard, and further including counting means for increasing the displayed number by a predetermined count in response to a predetermined input signal;

whereby said display device may be positioned on said platform when a photograph is made of an object received on said platform to enable the photograph to include both the image of the selected characters displayed by the display device and the image of said object.

2. A display device according to claim 1, wherein each digit section includes drive means for actuating selected segments in response to said predetermined combinations of electrical signals; and the circuit means comprises;

a plurality of storage means corresponding to the separate digit sections for storing said predetermined combinations of electrical signals and for providing said signals to the respective drive means of the separate digit sections, with each storage means including input terminals for receiving said combinations of signals and output terminals for providing said combinations of signals, and loading means responsive to a load pulse for storing said combination of signals received at the output terminals; and transfer means for transferring said combination of signals from the output terminals of one storage means to the input terminals of the storage means corresponding to the digit section providing the next greater significant digit in the multiple digit number display, wherein the transfer means include delay means for delaying said transfer for a duration exceeding the duration of said load pulse to thereby cause displayed numeric characters to be transferred to the next greater significant digit section each time a load pulse is received by the storage means.

3. A display device according to claim 2, wherein each of the storage means consists of a CMOS integrated circuit binary counter having a given input capacitance, and each of the delay means comprises said given input capacitance in combination with resistances connected in series between the respective output terminals of one CMOS counter and the input terminals of the CMOS counter corresponding to the digit section providing the next greater significant digit in the display.

4. A display device according to claim 1, wherein the keyboard device includes means for providing said predetermined input signal.

5. A display device according to claim 1, further comprising means for attachment to a said camera positioned for taking photographs of objects received on the platform, for providing said predetermined input signal in response to operation of said camera in taking a said photograph.

6. A display device according to claim 1, wherein the segments are luminous when actuated;

each digit section includes drive means for illuminating selected segments in response to said predetermined combinations of electrical signals;

the drive means include test means that are responsive to receipt of signal pulses to illuminate all of the segments for providing a display of symbols including all of the segments, and enable means that are responsive to an enable signal pulse for enabling illumination of said segments that are selected in response to said predetermined combinations of electrical signals; and the circuit means include first means for providing said enable signal pulses to the enable means at a first predetermined duty cycle for providing illumination of said selected segments at a first level that is clearly visible, and second means for providing said enable pulses to the test means at a second predetermined duty cycle for providing illumination of the non-selected segments at a second level that is not clearly visible.

7. A display device according to claim 1, wherein each of said segments includes a tungsten filament.

8. A display device according to claim 1, wherein the arrays of digit segments are of such dimensions as to provide a "0" character that is at least nine millimeters high and four and one-half millimeters wide.

9. A display device according to claim 1, comprising a first chassis for containing the digit sections;

a second chassis for containing the keyboard device; and means for coupling the keyboard device to the digit sections for enabling characters to be displayed by the digit sections in response to operation of the keyboard device at a location remote from the digit sections.

10. In combination, a photographic system comprising a platform for receiving objects to be photographed and means for supporting a camera for photographing objects received on said platform; and a display device comprising;

a plurality of digit sections arrayed to provide a display of a multiple digit number, each of which digit sections includes a display element having an array of a plurality of segments that are separately actuated in response to predetermined combinations of electrical signals for providing a display of an array of selected alphanumeric characters;

selecting means comprising a keyboard device for selecting said characters to be displayed; and circuit means for providing said predetermined combinations of electrical signals in response to the operation of said keyboard device; and further including counting means for increasing the displayed number by a predetermined count in response to a predetermined input signal;

said display device being positioned on said platform when a photograph is made of an object received on said platform to enable the photograph to include both the image of the selected characters displayed by the display device and the image of said object.

11. A combination according to claim 10, wherein the keyboard device includes means for providing said predetermined input signal.

12. A combination according to claim 10, further comprising means for attachment to a said camera positioned for taking photographs of objects received on the platform for providing said predetermined input signal in response to operation of said camera in taking a said photograph.

13. A combination according to claim 10, wherein the digit sections are arrayed to provide a display of a multiple digit number;

each digit section includes a display element having an array of a plurality of segments that are separately actuated for providing said selected numeric characters, and drive means for actuating selected segments in response to said predetermined combinations of electrical signals; and the circuit means comprises;

a plurality of storage means corresponding to the separate digit sections for storing said predetermined combinations of electrical signals and for providing said signals to the respective drive means for the separate digit sections, with each storage means including input terminals for receiving said combinations of signals and output terminals for providing said combinations of signals, and loading means responsive to a load pulse for storing said combination of signals received at the input terminals and providing said combination of signals at the output terminals; and transfer means for transferring said combination of signals from the output terminals of one storage means to the input terminals of the storage means corresponding to the digit section providing the next greater significant digit in the multiple digit number display, wherein the transfer means includes delay means for delaying said transfer for a duration exceeding the duration of said load pulse to thereby cause displayed numeric characters to be transferred to the next greater significant digit section each time a load pulse is received by the storage means.

14. A combination according to claim 13, wherein each of the storage means consists of a CMOS integrated circuit binary counter having a given input capacitance, and each of the delay means comprises said given input capacitance in combination with resistances connected in series between the respective output terminals of one CMOS counter and the input terminals of the CMOS counter corresponding to the digit section providing the next greater significant digit in the display.

15. A combination according to claim 10, wherein each digit section includes a display element having an array of a plurality of segments that are luminous when actuated, and which are separately actuated for providing said selected characters, and drive means for illuminating selected segments in response to said predetermined combinations of electrical signals;

the drive means include test means that are responsive to receipt of a signal pulse to illuminate all of the segments for providing a display of symbols including all of the segments, and enable means that are responsive to an enable signal pulse for enabling illumination of said segments that are selected in response to said predetermined combinations of electrical signals; and the circuit means include first means for providing said enable signal pulses to the enable means at a first predetermined duty cycle for providing illumination of said selected segments at a first level that is clearly visible, and second means for providing said enable pulses to the test means at a second predetermined duty cycle for providing illumination of the non-selected segments at a second level that is not clearly visible.

16. A combination according to claim 10, wherein each digit section comprises a display element having an array of a plurality of segments that are separately illuminated for providing said selected characters, and each of said segments includes a tungsten filament.

17. A combination according to claim 16, wherein the arrays of digit segments are of such dimensions as to provide a "0" character that is at least nine millimeters high and four and one-half millimeters wide.

18. A combination according to claim 11, wherein the arrays of digit segments are of such dimensions as to provide a "0" character that is at least nine millimeters high and four and one-half millimeters wide.

19. A combination according to claim 10, comprising a first chassis for containing the digit sections;

a second chassis for containing the keyboard device; and means for coupling the keyboard device to the digit sections for enabling characters to be displayed by the digit sections in response to operation of the keyboard device at a location remote from the digit sections.

* * * * *